United States Patent [19]
Horikawa

[11] Patent Number: 5,081,356
[45] Date of Patent: Jan. 14, 1992

[54] IMAGE READ-OUT APPARATUS

[75] Inventor: Kazuo Horikawa, Kanagawa, Japan

[73] Assignee: Fuji Photo Film Co., Ltd., Kanagawa, Japan

[21] Appl. No.: 642,743

[22] Filed: Jan. 17, 1991

[30] Foreign Application Priority Data

Jan. 17, 1990 [JP] Japan ........................................ 2-7331

[51] Int. Cl.$^5$ ............................................. G01N 23/04
[52] U.S. Cl. ................................. 250/327.2; 250/236
[58] Field of Search ................ 250/327.2 D, 327.2 F, 250/327.26, 236; 358/494, 496

[56] References Cited

U.S. PATENT DOCUMENTS

| | | | |
|---|---|---|---|
| 4,258,264 | 3/1981 | Kotera et al. | 250/327.2 |
| 4,276,473 | 6/1981 | Kato et al. | 250/327.2 |
| 4,315,318 | 2/1982 | Kato et al. | 250/327.2 |
| 4,387,428 | 6/1983 | Ishida et al. | 250/327.2 |
| 4,602,156 | 7/1986 | Asai et al. | 250/327.2 |
| 4,859,850 | 8/1989 | Funahashi et al. | 250/327.2 |
| 4,868,857 | 9/1989 | Dobbins, III | 378/99 |
| 4,950,894 | 8/1990 | Hara et al. | 250/327.2 |
| 5,028,782 | 7/1991 | Nakajima | 250/327.2 |

FOREIGN PATENT DOCUMENTS 56-11395  2/1981  Japan .

Primary Examiner—Carolyn E. Fields
Assistant Examiner—Drew A. Dunn
Attorney, Agent, or Firm—Sughrue, Mion, Zinn, Macpeak & Seas

[57] ABSTRACT

In an image read-out apparatus, a recording medium, on which an image has been recorded, is two-dimensionally scanned with a light beam. Light, which is radiated out of the recording medium during the scanning and which represents the image, is detected with a photoelectric sensor, and a time-serial image signal is thereby generated. In the course of generating the image signal, a peak value dectector sequentially detects peak values occurring at parts of the image signal. A light detecting sensitivity controller controls the sensitivity, with which the photoelectric sensor detects the light radiated out of the recording medium, in accordance with the peak values, which have been detected sequentially, such that the value of the image signal does not exceed a predetermined value. A correction device corrects the image signal in accordance with a signal representing the sensitivity, with which the photoelectric sensor detects the light radiated out of the recording medium.

6 Claims, 1 Drawing Sheet

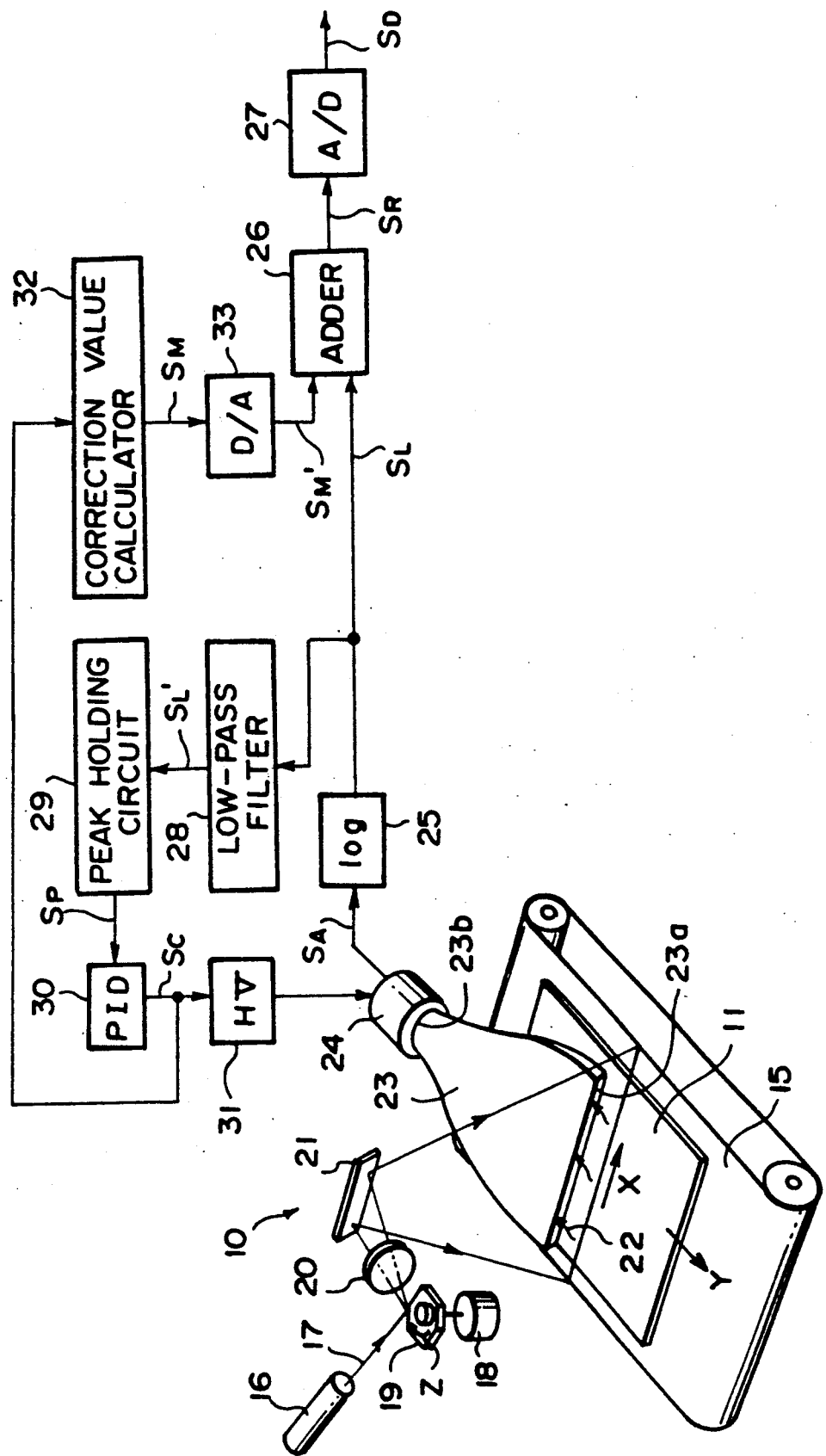

IMAGE READ-OUT APPARATUS

BACKGROUND OF THE INVENTION

1. Field of the Invention

This invention relates to an image read-out apparatus wherein a recording medium, on which an image has been recorded, is two-dimensionally scanned with a light beam, and light which is radiated out of the recording medium during the scanning and which represents the image is detected with a photoelectric sensor, a time-serial image signal being thereby generated.

1. Description of the Prior Art

Techniques for reading out an image, which has been recorded on a recording medium, in order to obtain an image signal, carrying out appropriate image processing on the image signal, and then reproducing a visible image by use of the processed image signal have heretofore been known in various fields.

For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on photographic film, or the like. In this manner, a visible image having good image quality with high contrast, high sharpness, high graininess, or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the image recording and reproducing systems described above, the intensity of light, which is radiated out of a recording medium (such as X-ray film or a stimulable phosphor sheet) carrying an image recorded thereon and which represents the image, may detected with a detection capacity of approximately 3 orders of ten (i.e. such that the highest intensity of the light is detected to be approximately $1.0 \times 10^3$ when the lowest intensity of the light is detected to be 1.0). In such cases, theoretically, a visible image can be reproduced from the image signal thus obtained, which visible image contains broad image information ranging from a low image density region to a high image density region.

However, the mean intensity of light representing an image is not necessarily constant and is generally unknown before the image read-out operation is carried out. Therefore, if the dynamic range of a photoelectric sensor, which detects the light representing the image, or the dynamic range of the system, which processes the image signal, is as narrow as 3 orders of ten, the low image density region or the high image density region of the information representing the image, which is recorded on the recording medium, cannot be detected normally. This problem occurs unless the mean intensity of the light representing the image matches with the gain or the signal level in the photoelectric sensor or the signal processing system. When a visible image is reproduced from the image signal thus obtained, part of the information about the original image is lost in the visible image.

In order to eliminate the aforesaid problems, the method described below has heretofore been employed. Specifically, such that no problem may occur when the mean intensity of light representing an image fluctuates slightly, a high-performance photoelectric sensor is used which has a wide dynamic range and can accurately detect the intensity of light over a range of, for example, at least 4 orders of ten. Also, a signal processing system is constituted of high-performance circuit devices, which can process a signal over a dynamic range of at least 4 orders of ten, and the configuration of the circuits is devised in a specific manner. However, with this method, because the high-performance photoelectric sensor and the high-performance circuit devices must be used, the manufacturing cost cannot be kept low. Also, a wide dynamic range cannot be achieved unless the speed, with which a signal is processed, is kept low.

As another method for eliminating the aforesaid problems, the method described below has also been proposed. Specifically, in cases where an image, which has been stored on, for example, a stimulable phosphor sheet, is read out, a preliminary read-out operation is carried out before a final read-out operation, wherein the image is read out at a sufficiently high accuracy, is carried out. With the preliminary read-out operation, the stimulable phosphor sheet is exposed to comparatively weak stimulating rays, which cause the stimulable phosphor sheet to emit light in proportion to the amount of energy stored thereon during its exposure to radiation. During the detection of the emitted light, the gains in a photoelectric sensor and a signal processing system are set to low values. (If the gains are set to low values, the resolution of image density will deteriorate.) A preliminary read-out image signal, which has been obtained from the preliminary read-out operation, is then analyzed. From the results of analysis, the level of light, which will be emitted by the stimulable phosphor sheet during the final read-out operation, is predicted. During the final read-out operation, the gains in the photoelectric sensor and the signal processing system are adjusted to appropriate values in accordance with the results of prediction. In this manner, an image signal is obtained which accurately represents the image stored on the stimulable phosphor sheet. However, with the proposed method, in order to generate a single image signal, two read-out operations must be carried out on the stimulable phosphor sheet. Therefore, the processing capacity of the image read-out apparatus per unit time cannot be kept large.

SUMMARY OF THE INVENTION

The primary object of the present invention is to provide an image read-out apparatus, which accurately detects an image recorded on a recording medium even if the mean intensity of light radiated out of the recording medium and representing the image is unknown, and in which a photoelectric sensor and circuit devices having a wide dynamic range need not be used, so that the manufacturing cost can be kept low and the image can be read out quickly.

Another object of the present invention is to provide an image read-out apparatus, which accurately detects an image recorded on a recording medium even if the mean intensity of light radiated out of the recording medium and representing the image is unknown, and in which a plurality of image read-out operations, such as a preliminary read-out operation and a final read-out operation, need not be carried out for a single image, the processing capacity being thereby kept large.

The present invention provides an image readout apparatus for two-dimensionally scanning a recording medium, on which an image has been recorded, with a light beam, and detecting light, which is radiated out of the recording medium during the scanning and which represents the image, with a photoelectric sensor, a time-serial image signal being thereby generated, wherein the improvement comprises the provision of:
i) a peak value detecting means which, in the course of generating said image signal, sequentially detects peak values occurring at parts of said image signal,
ii) a light detecting sensitivity control means for controlling the sensitivity, with which said photoelectric sensor detects the light radiated out of said recording medium, in accordance with said peak values, which have been detected sequentially, such that the value of said image signal does not exceed a predetermined value, and
iii) a correction means for correcting said image signal in accordance with a signal representing the sensitivity, with which said photoelectric sensor detects the light radiated out of said recording medium.

With the image read-out apparatus in accordance with the present invention, in the course of generating an image signal, peak values occurring at parts of the image signal are detected sequentially. Also, the sensitivity, with which the photoelectric sensor detects the light radiated out of the recording medium, is controlled in accordance with the peak values, which have been detected sequentially, such that the value of the image signal does not exceed a predetermined value. Therefore, the photoelectric sensor having a comparatively narrow dynamic range may be utilized. Also, it is unnecessary that two image read-out operations, such as a preliminary read-out operation and a final read-out operation, are carried out, for example, in order for the sensitivity, with which the photoelectric sensor detects the light radiated out of the recording medium during the final read-out operation, to be adjusted in accordance with the results of analysis of a preliminary read-out image signal obtained from the preliminary read-out operation.

The level of the image signal changes as a result of the control of the sensitivity, with which the photoelectric sensor detects the light radiated out of the recording medium. However, with the image read-out apparatus in accordance with the present invention, the image signal is corrected in accordance with a signal representing the sensitivity, with which the photoelectric sensor detects the light radiated out of the recording medium. Therefore, errors can be eliminated, which occur in the level of the image signal as a result of the control of the sensitivity, with which the photoelectric sensor detects the light radiated out of the recording medium. Also, the correction of the image signal can be carried out after the image signal, which has been detected by the photoelectric sensor, is converted logarithmically. Therefore, the dynamic ranges of the circuit devices of the signal processing system may be comparatively narrow, and the image read-out operation can be carried out quickly.

BRIEF DESCRIPTION OF THE DRAWING

The single drawing is a schematic view showing an embodiment of the image read-out apparatus in accordance with the present invention.

DESCRIPTION OF THE PREFERRED EMBODIMENTS

The present invention will hereinbelow be described in further detail with reference to the accompanying drawing.

The accompanying drawing is a schematic view showing an embodiment of the image read-out apparatus in accordance with the present invention. The image read-out apparatus is constituted as a radiation image read-out apparatus wherein a radiation image is read out from a stimulable phosphor sheet, on which the radiation image has been stored, and an image signal is thereby generated.

In a radiation image recording apparatus (not shown), a stimulable phosphor sheet 11 is exposed to radiation, which has passed through an object. A radiation image of the object is thereby stored on the stimulable phosphor sheet 11. The stimulable phosphor sheet 11, on which the radiation image has been stored, is then set at a predetermined position in a radiation image read-out apparatus 10.

The stimulable phosphor sheet 11, which has been set at the predetermined position, is then conveyed in a sub-scanning direction indicated by the arrow Y by a sheet conveyance means 15, which may be constituted of an endless belt, or the like. The sheet conveyance means 15 is operated by an operating means (not shown). A laser beam 17, which serves as stimulating rays, is produced by a laser beam source 16, and is reflected and deflected by a rotating polygon mirror 19 which is quickly rotated by a motor 18 in the direction indicated by the arrow Z. The laser beam 17 then passes through a converging lens 20, which may be constituted of an fθ lens, or the like. The direction of the optical path of the laser beam 17 is then changed by a mirror 21, and the laser beam 17 impinges upon the stimulable phosphor sheet 11 and scans it in a main scanning direction indicated by the arrow X, which direction is approximately normal to the subscanning direction indicated by the arrow Y. When the stimulable phosphor sheet 11 is exposed to the laser beam 17, the exposed portion of the stimulable phosphor sheet 11 emits light 22 in an amount proportional to the amount of energy stored thereon during its exposure to the radiation. The emitted light 22 is guided by a light guide member 23 and photoelectrically detected by a photomultiplier 24. The light guide member 23 is made from a light guiding material such as an acrylic plate and has a linear light input face 23a, positioned so that it extends along the main scanning line on the stimulable phosphor sheet 11, and a ring-shaped light output face 23b, positioned so that it is in close contact with a light receiving face of the photomultiplier 24. The emitted light 22, which has entered the light guide member 23 at its light input face 23a, is guided through repeated total reflection inside of the light guide member 23, emanates from the light output face 23b, and is received by the photomultiplier 24. In this manner, the amount of the emitted light 22, which amount represents the radiation image, is converted into an electric signal by the photomultiplier 24.

An analog signal SA generated by the photomultiplier 24 is logarithmically amplified by a logarithmic amplifier 25, passes through an adder 26, and is then fed into an A/D converter 27. The A/D converter 27 samples the analog signal and converts it into a digital image signal SD. The image signal SD is fed into an image processing unit (not shown), which carries out appropriate image processing on the image signal SD. After being processed, the image signal SD is fed into an image reproducing apparatus (not shown), which reproduces a visible image from the image signal SD.

The output signal SL generated by the logarithmic amplifier 25 is fed into the adder 26. The output signal SL is also fed into a low-pass filter 28. An image signal SL', which has passed through the low-pass filter 28, is fed into a peak holding circuit 29. The peak holding circuit 29 thus receives the image signal SL', which has been logarithmically converted and passed through the low-pass filter 28, and sequentially holds peak values of parts of the image signal SL', each of which parts corresponds to one main scanning line formed by the laser beam 17 on the stimulable phosphor sheet 11. Each of the peak values is renewed for each main scanning line. The peak holding circuit 29 thus generates a signal SP representing the peak values. The signal SP is fed into a PID control circuit 30. The PID control circuit 30 generates a control signal SC and controls the value of a high voltage which is applied to the photomultiplier 24. When the mean amount of the light 22 emitted by the stimulable phosphor sheet 11 is large, the PID control circuit 30 adjusts the high voltage to a comparatively small value, such that the level of the signal SA generated by the photomultiplier 24 does not exceed a predetermined value. When the mean amount of the light 22 emitted by the stimulable phosphor sheet 11 is small, the PID control circuit 30 adjusts the high voltage to a comparatively large value. The control signal SC generated by the PID control circuit 30 is fed into a power source circuit 31, which applies a high voltage to the photomultiplier 24. The power source circuit 31 applies a high voltage having a level corresponding to the control signal SC to the photomultiplier 24.

The level of the control signal SC corresponds to the level of the voltage applied to the photomultiplier 24. The control signal SC is also fed into a correction value calculating circuit 32. The correction value calculating circuit 32 stores information about the relationship between the values of the control signal SC (the values of the voltage applied to the photomultiplier 24) and correction values for the output signal SL generated by the logarithmic amplifier 25. Upon receiving the control signal SC, the correction value calculating circuit 32 generates a signal SM which represents the correction value corresponding to the value of the control signal SC. Because the signal SM is digital, it is converted by a D/A converter 33 into an analog signal SM'. The analog signal SM' is fed into the adder 26. The adder 26 adds the output signal SL, which has been generated by the logarithmic amplifier, and the signal SM'. In this manner, the adder 26 generates an image signal SR, which accurately represents the radiation image stored on the stimulable phosphor sheet 11. As described above, the image signal SR is converted by the A/D converter 27 into the digital image signal SD.

As described above, the value of the high voltage applied to the photomultiplier 24 is controlled in accordance with the peak values of parts of the image signal SL which has been amplified logarithmically (strictly speaking, the peak values of parts of the image signal SL' which has passed through the low-pass filter 28), each of which parts corresponds to one main scanning line. Therefore, the dynamic range of the photomultiplier 24 may be as narrow as, for example, approximately 3 orders of ten, and need not be wider than the dynamic range necessary for the readout of a single image. Also, the image signal SL, which has been generated by the logarithmic amplifier 25, is corrected in accordance with the value of the high voltage applied to the photomultiplier 24. Therefore, an image signal, which accurately represents the radiation image stored on the stimulable phosphor sheet 11, can be obtained ultimately. Additionally, a very wide dynamic range is not required. Therefore, a signal can be processed quickly. Accordingly, the scanning can be carried out quickly, and the processing capacity of the image read-out apparatus can be kept large.

The image read-out apparatus in accordance with the present invention may be embodied in various manners other than the embodiment described above. For example, the holding of the peak value need not necessarily be carried out for each of the main scanning lines, and may be carried out in various other manners in accordance with, e.g. the response characteristics with which the high voltage applied to the photomultiplier 24 is to be changed. Also, the circuit configuration is not limited to the one employed in the aforesaid embodiment, and one of various circuit configurations may be utilized. Additionally, the photoelectric sensor, which detects the light 22 emitted by the stimulable phosphor sheet 11, is not limited to the photomultiplier and may be constituted of one of devices selected in accordance with the characteristics of the image, which has been stored on the stimulable phosphor sheet 11, the accuracy, with which the image signal is to be detected, or the like. By way of example, the photoelectric sensor may be constituted of an avalanche photodiode.

In the embodiment described above, a radiation image stored on a stimulable phosphor sheet is read out. However, the image read-out apparatus in accordance with the present invention is also applicable when general images are read out.

I claim:

1. An image read-out apparatus for two-dimensionally scanning a recording medium, on which an image has been recorded, with a light beam, and detecting light, which is radiated out of the recording medium during the scanning and which represents the image, with a photoelectric sensor, a time-serial image signal being thereby generated, wherein the improvement comprises the provision of:
   i) a peak value detecting means which, in the course of generating said image signal, sequentially detects peak values occurring at parts of said image signal,
   ii) a light detecting sensitivity control means for controlling the sensitivity, with which said photoelectric sensor detects the light radiated out of said recording medium, in accordance with said peak values, which have been detected sequentially, such that the value of said image signal does not exceed a predetermined value, and
   iii) a correction means for correcting said image signal in accordance with a signal representing the sensitivity, with which said photoelectric sensor detects the light radiated out of said recording medium.

2. An apparatus as defined in claim 1 wherein said recording medium is a stimulable phosphor sheet on which a radiation image has been stored.

3. An apparatus as claimed in claim 2 wherein an image signal representing said radiation image is generated by exposing said stimulable phosphor sheet to said light beam of stimulating rays, said stimulating rays causes stimulable phosphor sheet to emit light in proportion to the amount of energy stored thereon during its exposure to radiation, and the emitted light is directed photoelectrically.

4. An apparatus as defined in claim 3 wherein said stimulating rays are a laser beam.

5. An apparatus as defined in claim 1 wherein said recording medium is photographic film.

6. An apparatus as defined in claim 1 wherein said photoelectric sensor is a photomultiplier.

* * * * *